US 12,013,534 B2

(12) United States Patent
Moll et al.

(10) Patent No.: US 12,013,534 B2
(45) Date of Patent: Jun. 18, 2024

(54) METHOD FOR OPERATING VIRTUAL REALITY GLASSES IN A VEHICLE AND VIRTUAL REALITY SYSTEM WITH VIRTUAL REALITY GLASSES AND A VEHICLE

(71) Applicant: AUDI AG, Ingolstadt (DE)

(72) Inventors: Tobias Moll, Ingolstadt (DE); Tahar Bouaziz, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/642,127

(22) PCT Filed: Jul. 13, 2020

(86) PCT No.: PCT/EP2020/069769
§ 371 (c)(1),
(2) Date: Mar. 10, 2022

(87) PCT Pub. No.: WO2021/047805
PCT Pub. Date: Mar. 18, 2021

(65) Prior Publication Data
US 2022/0382050 A1 Dec. 1, 2022

(30) Foreign Application Priority Data
Sep. 11, 2019 (DE) .......................... 102019124386.6

(51) Int. Cl.
*G02B 27/01* (2006.01)
*B60K 35/00* (2006.01)

(52) U.S. Cl.
CPC ............ *G02B 27/017* (2013.01); *B60K 35/00* (2013.01); *B60K 2360/31* (2024.01); *G02B 2027/0178* (2013.01); *G02B 2027/0183* (2013.01)

(58) Field of Classification Search
CPC ................................................ B60K 2370/177
See application file for complete search history.

(56) References Cited

U.S. PATENT DOCUMENTS

| 2005/0190258 A1 | 9/2005 | Siegel et al. |
| 2006/0015000 A1 | 1/2006 | Kim |
| (Continued) | | |

FOREIGN PATENT DOCUMENTS

| CN | 109478094 A | 3/2019 |
| DE | 10 2013 016 921 A1 | 4/2015 |
| (Continued) | | |

OTHER PUBLICATIONS

International Search Report (Forms PCT/ISA210; PCT/ISA/220); mailed Oct. 6, 2020 in corresponding PCT Application No. PCT/EP2020/069769 (5 pages) (2 pages English Translation).
(Continued)

*Primary Examiner* — Nan-Ying Yang
(74) *Attorney, Agent, or Firm* — STAAS & HALSEY LLP

(57) ABSTRACT

A method of operating virtual reality glasses in a vehicle in which a risk of motion sickness for a wearer of the virtual reality glasses is reduced with the aid of the method. A virtual reality system (IO) includes the virtual reality glasses and the vehicle. According to the method, a vehicle movement of the vehicle is evaluated in such a way that ultimately, after the image data describing the virtual surroundings have been split into a background image dataset and a foreground image dataset, a lateral offset for a position of an object in the foreground in comparison with the background is determined, so that virtual surroundings which are processed in this way can be determined and displayed. Alternatively, the virtual surroundings can be enlarged in accordance with the vehicle movement, and processed virtual surroundings can be determined by means of a movement of
(Continued)

the enlarged virtual surroundings along a movement trajectory, and displayed.

20 Claims, 3 Drawing Sheets

(56) References Cited

U.S. PATENT DOCUMENTS

| | | | |
|---|---|---|---|
| 2015/0097860 A1 | 4/2015 | Alaniz | |
| 2017/0113641 A1* | 4/2017 | Thieberger | B60R 21/04 |
| 2017/0253252 A1 | 9/2017 | Donnelly et al. | |
| 2017/0352129 A1* | 12/2017 | Fu | H04N 23/683 |
| 2018/0089900 A1 | 3/2018 | Rober et al. | |
| 2019/0236999 A1* | 8/2019 | Mertens | G06F 3/013 |
| 2019/0269881 A1 | 9/2019 | Iida | |

FOREIGN PATENT DOCUMENTS

| | | |
|---|---|---|
| DE | 10 2015 003 882 A1 | 9/2016 |
| DE | 10 2015 003882 A1 | 9/2016 |
| DE | 10 2016 120 427 A1 | 4/2017 |
| DE | 10 2016 120427 A1 | 4/2017 |
| DE | 10 2016 212 687 A1 | 1/2018 |
| EP | 1 977 931 A1 | 10/2008 |
| EP | 10 2014 220 053 A1 | 7/2015 |

OTHER PUBLICATIONS

Written Opinion (Form PCT/ISA/237); mailed Oct. 6, 2020 in corresponding PCT Application No. PCT/EP2020/069769 (8 pages).
Form PCT/IPEA/416 dated Nov. 22, 2021 in corresponding PCT Application No. PCT/EP2020/069769 (16 pages).
German Office Action dated Aug. 25, 2023 for German Application No. 10 2019 124 386.6.
International Preliminary Report on Patentability dated Nov. 18, 2021 for International Application No. PCT/EP2020/069769 (21 pages).
PCT/EP2020/069769, filed Jul. 13, 2020, Tobias Moll, Audi AG.
10 2019 124 386.6, filed Sep. 11, 2019, Tobias Moll, Audi AG.
Chinese Office Action dated Mar. 20, 2024 for Chinese Application No. 202080063218.5.

* cited by examiner

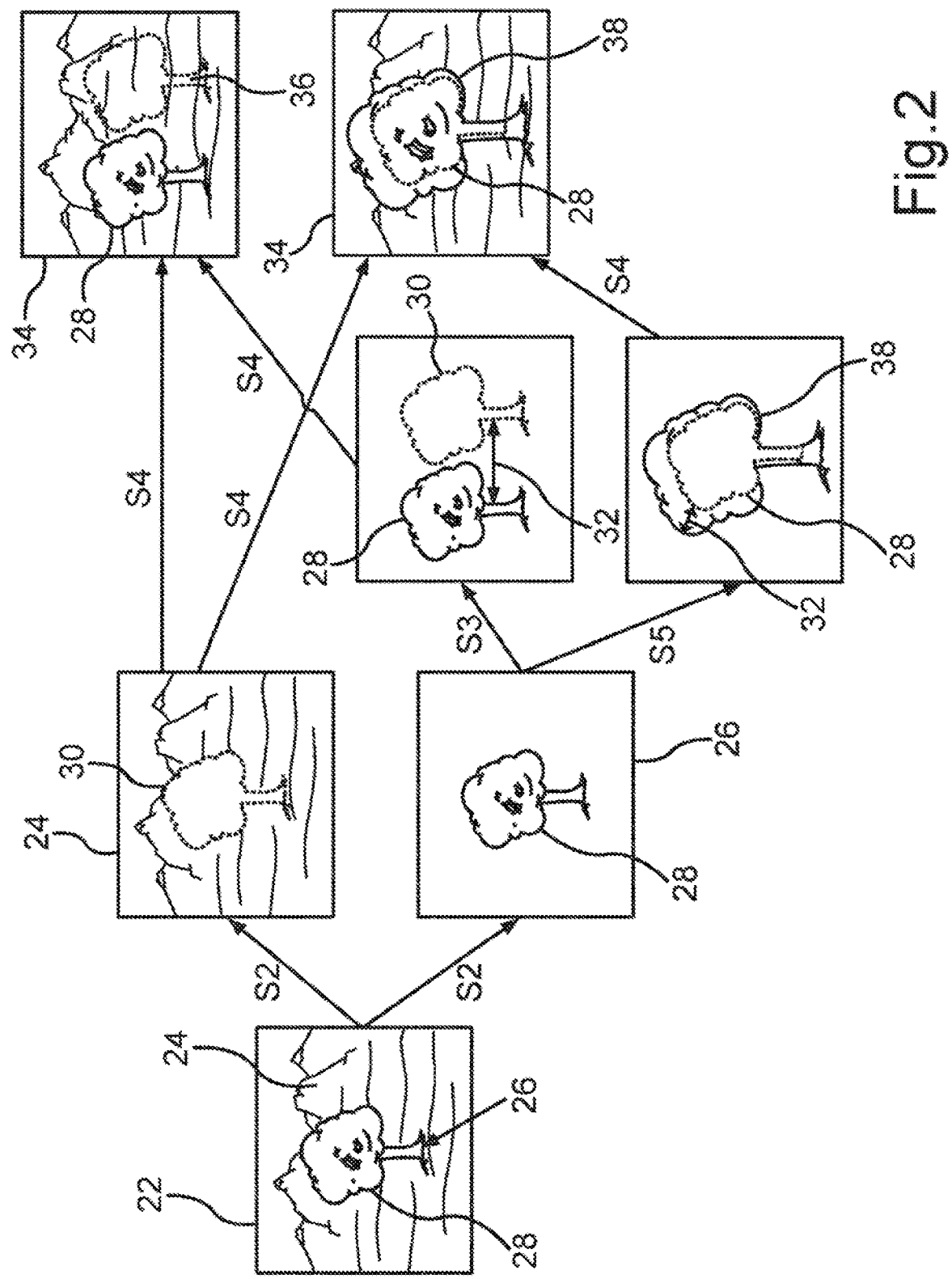

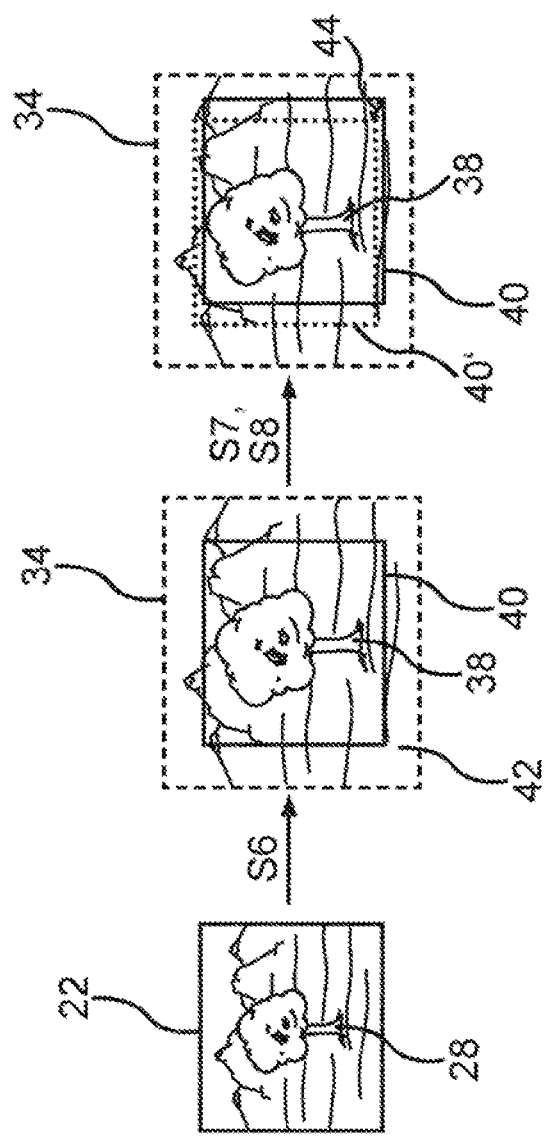

METHOD FOR OPERATING VIRTUAL REALITY GLASSES IN A VEHICLE AND VIRTUAL REALITY SYSTEM WITH VIRTUAL REALITY GLASSES AND A VEHICLE

CROSS-REFERENCE TO RELATED APPLICATIONS

This application is a U.S. national stage of International Application No. PCT/EP2020/069769, filed on Jul. 13, 2020. The International Application claims the priority benefit of German Application No. 10 2019 124 386.6 filed on Sep. 11, 2019. Both the International Application and the German Application are incorporated by reference herein in their entirety.

BACKGROUND

Described below is a method for operating virtual reality glasses in a vehicle, in particular in a motor vehicle, as well as to a virtual reality system with virtual reality glasses and a vehicle.

In a virtual reality system, that is, a so-called virtual reality (VR) system, or a so-called mixed reality (MR) system, a wearer of a pair of glasses, that is, a wearer of VR glasses or MR glasses, often experiences symptoms of travel sickness if the wearer is wearing the glasses in moving surroundings. The reason for this is that there is a contradiction between the perceived sensory stimuli, that is, the macroscopic movement of the wearer's body, for example, in a moving motor vehicle in which the wearer of the VR glasses is sitting, and the virtual surroundings displayed by the glasses and visually perceived by the wearer. This is because, while the wearer of the VR glasses is sitting in the motor vehicle and is moving along with the movement of the motor vehicle, the wearer receives visual stimuli that deviate from this motion because of the glasses. Expressed in simple terms, the visually perceived movement and the movement and acceleration felt by the wearer's body do not match for the wearer of the glasses. This often leads to a strong feeling of being unwell, as the wearer suffers from so-called travel sickness, which is often called "motion sickness" and is known as kinetosis in medical terminology.

The US patent 2018 0089900 A1 shows a VR system for motor vehicles for reducing the risk of kinetosis for a wearer of a corresponding pair of VR glasses. For this purpose, the VR system provides a display in which visual cues correspond to the movement physically experienced by the person. For example, visual cues are displayed that indicate a flowing motion past the wearer. A speed of this visual information is adapted to the speed or acceleration of the motor vehicle.

The US patent 2017/0253252 A1 shows a system in which a driver wears VR glasses in a motor vehicle. Depending on the movement of the vehicle, a visual graphic is displayed on the VR glasses which is in the form, for example, of a force vector of an expected movement of the vehicle, which in this case is driven autonomously. In addition, a virtual sphere can be moved in a virtual container to indicate an expected direction of motion of the motor vehicle.

The US patent 2006/0015000 A1 describes a system for reducing a kinetosis risk for an occupant of a moving motor vehicle, in which video data of the vehicle's surroundings is acquired and displayed to the occupant of the vehicle. A section or an enlarged section of the video image can be displayed, depending on which section of the image for the occupant corresponds to an actual field of view of the occupant, based on their viewing direction.

SUMMARY

Described below is a way of which a pair of virtual reality glasses can be operated in such a way that the risk of kinetosis is reduced for a wearer of the virtual reality glasses in a moving vehicle.

Existing known methods for reducing the risk of kinetosis for the wearer of virtual reality (VR) glasses in a moving vehicle, may be by way of specific contents created which are then displayed to the wearer. For example, content influenced by a current trajectory of the vehicle is produced for the VR glasses, such as the sphere moving in a container described above. However, it is not always desirable to create additional content for a virtual surroundings displayed by the VR glasses merely to reduce the risk of kinetosis, as such a procedure is time-consuming and can lead to unwanted virtual content in the virtual surroundings displayed. The method described is therefore based on the fact that only already known image contents of the virtual surroundings are processed without the need to explicitly generate new image contents, in order to contribute to a reduction of the kinetosis risk for the wearer of the VR glasses.

The first aspect of the method of operating VR glasses in a vehicle reduces a risk of kinetosis for a wearer of the VR glasses in the vehicle. The vehicle may be a motor vehicle operating on ground or water. Alternatively, for example, an aircraft can be used as the vehicle by operating the VR glasses. In the following, the example of a motor vehicle is always given as the vehicle in which the VR glasses are operated. The VR glasses are generally used to display a virtual surroundings described by predefined image data to the wearer of the VR glasses. VR refers to the representation and simultaneous perception of a real event and its physical properties in real time in a computer-generated interactive virtual environment. As an alternative to the VR glasses described here, the method can be implemented using a VR contact lens, for example. However, the following text always refers to a pair of VR glasses as the display device for displaying the virtual surroundings.

In the method for operating a control device of the VR glasses, the movement data describing a vehicle movement, acquired by an acquisition device of the vehicle, is received. For example, a vehicle sensor system can be used to quantify a speed, acceleration, angle of wheel impact, and/or a degree of vehicle vibration caused by a ride on a bumpy road. Alternatively, or in addition, predictive route data can be used as movement data, which includes information about a previous route and which can therefore also be used to determine the aforementioned movement data. Such predictive route data may be available, for example, to a vehicle's navigation system. This means that there is data that describes the current movement and, if applicable, the expected future movement of the vehicle. This data is acquired in the individual acquisition devices and transferred to the control device of the VR glasses, for example, via a suitable communication link between an acquisition device of the vehicle. This communication link can be implemented wirelessly, for example, via a wireless local area network (WLAN), a Bluetooth connection and/or a mobile data network based on the long-term evolution (LTE), long-term evolution advanced (LTE-A), or Fifth Generation (5G) mobile radio standard.

Next, the image data describing the virtual surroundings is split into a background image dataset and a foreground image dataset. The background image dataset characterizes a background of the virtual surroundings. The foreground image dataset characterizes at least one object positioned in the foreground of the virtual surroundings. This splitting of the virtual surroundings is carried out by applying an image processing criterion to the image data describing the virtual surroundings. In the form of the image processing criterion, at least one image processing algorithm is stored which enables the described splitting of the image data into the foreground image dataset and the background image dataset. For example, the image processing algorithm can be based on edge detection, contrast detection, and/or artificial intelligence methods. For example, if a flat landscape with a mountain range in the background is displayed as the virtual surroundings with a single tree located in the foreground, the flat plane with the mountain range as the background image dataset is separated from the tree as an object positioned in the foreground of the virtual surroundings. As a result, there are two planes of image data that have been separated from each other. If there are multiple objects in the foreground of the virtual surroundings, they may be arranged on a common foreground plane. However, alternatively or in addition, it is possible to differentiate multiple foreground planes.

Next, the acquired movement data is evaluated to determine a lateral offset between a position of the at least one object positioned in the foreground of the virtual surroundings and the background. According to the lateral offset, it can thus be specified that the foreground is shifted to the left relative to the background by, for example, one millimeter towards the eyes of the wearer of the VR glasses. It is assumed here that the lateral offset is chosen in such a way that if the at least one object in the foreground is moved relative to the background of the virtual surroundings, the risk of kinetosis to the wearer of the VR glasses is reduced because a probability value for a probability of kinetosis for the wearer of the VR glasses is below a predefined minimum probability value due to the relative displacement of the two image planes described. A direction of the lateral offset typically corresponds to a direction of motion of the vehicle. For example, if the vehicle turns off to the right relative to a current direction of travel in a longitudinal direction of the vehicle, a corresponding lateral offset of the tree positioned in the foreground relative to the mountain range in the background is determined, in which the tree is moved from a current position to the left in the viewing direction of the eyes of the wearer of the VR glasses. The two image planes are thus moved relative to each other in a manner that matches the received movement data of the vehicle. As an alternative to moving the tree to the left, the mountain range can be moved from its current position to the right, or the tree is both moved to the left and the mountain range to the right, i.e. the tree and the mountain range are moved away from each other according to the lateral offset.

Next, to implement the relative offset, processed image data describing a processed virtual surroundings is determined, in which the at least one object in the foreground is shifted relative to the background according to the determined lateral offset. Thus, new image data is generated for display on the VR glasses, which data describes the desired processed virtual surroundings due to the lateral offset. Lastly, the processed virtual surroundings described by the processed image data is displayed using the VR glasses.

An advantage of the method is that existing VR content, i.e. the virtual surroundings already described using the predefined image data, is used without the need for virtual image content produced specifically to reduce the kinetosis risk of the wearer of the VR glasses. For example, a 360 degree representation of a virtual landscape, a video and/or a cartoon can be displayed as the virtual surroundings. Based on the movement data describing the vehicle's movement, a corresponding relative movement of the background plane with respect to the foreground plane takes place, wherein such movement is also physically felt by the wearer of the VR glasses due to the movement of the vehicle. The visual movement in the virtual surroundings is thus adapted to the movement of the vehicle experienced by the wearer. This significantly reduces the risk of kinetosis for the wearer of the VR glasses. This method is also applicable to both static and moving virtual environmental content displayed on the VR glasses. For example, it can also be used for a displayed cartoon or video content, wherein a given object in the foreground of such moving video content is moved, for example, in such a way that its movement specified by the video content is offset with the determined lateral offset, for example, by adding the two. This reduces the risk of kinetosis for the wearer of VR glasses, and in a particularly simple and convenient manner for the wearer, since no additional image content is generated and displayed.

The described embodiments result in additional advantages.

In an advantageous embodiment, the determined lateral offset and a steering angle of the vehicle, which is included in the movement data, are correlated non-linearly. Therefore, in the event of a particularly large movement of the vehicle, the foreground is not shifted as much relative to the background as would be expected from the movement data of the vehicle. Instead, it is possible to carry out only an attenuated movement of the foreground relative to the background, which ultimately only implies the direction of the movement experienced by the wearer of the VR glasses due to the vehicle movement by the lateral offset of the two image planes with respect to each other. This is because such an attenuated movement in the virtual surroundings in comparison to the movement actually made by the vehicle can be sufficient to reduce the discrepancy between the movement seen and felt by the wearer of the VR glasses in such a way that the risk of kinetosis is significantly reduced. One advantage of this is that no sharp deviation or movement that might be perceived as disturbing is artificially generated within the virtual surroundings, which is unlikely to be desirable for the wearer since it strongly influences the virtual surroundings, for example. The attenuated relative movement of the foreground with respect to the background achieves a minimal change in the processed virtual surroundings displayed compared with the original virtual surroundings, while at the same time significantly reducing the risk of kinetosis for the wearer of the VR glasses. This ultimately keeps the effect of the method on the processed virtual surroundings displayed to a minimum so that the wearer of the VR glasses continues to be conveniently shown the virtual surroundings he or she wants, since the processed virtual surroundings differs as little as possible from the original virtual surroundings.

According to a further embodiment, it is provided that the at least one object positioned in the foreground of the virtual surroundings is enlarged by a predefined magnification factor. In the processed virtual surroundings, the enlarged at least one object is displaced relative to the background. For example, it may be provided that the object detected in the foreground in the form of the tree is displayed enlarged by a factor of ten percent, for example, with respect to the background and in the processed virtual surroundings is displayed as a tree enlarged by ten percent and moved to the left by, for example, five millimeters in the viewing direction of the wearer. This makes it possible for an image gap, which generally arises in the background image dataset due to displacement of the object in the foreground relative to the background, to be hidden and therefore not visible in the processed virtual surroundings. This is because the enlargement of the object in the foreground does not create a gap visible to the wearer of the VR glasses, despite this lateral offset between the original position of the object in the foreground and the position now occupied by this object in the processed virtual surroundings provided, because this gap is already concealed by the object itself due to the enlargement of the virtual object in the processed virtual surroundings. For example, the magnification factor used here can be one percent, two percent, three percent, four percent, five percent, ten percent, 15 percent, 20 percent, 25 percent, or 30 percent.

This makes it particularly simple to view the processed virtual surroundings using VR glasses without processing the background image dataset and simply by enlarging the virtual object in the virtual foreground. The wearer of the VR glasses thus does not perceive any possibly disturbing effects of the method in the virtual surroundings caused by the displacement of the object in the foreground relative to the background. A suitable magnification of the at least one object in the foreground can be chosen depending on the size of the lateral offset. The two values of the lateral offset and the predefined magnification factor can thus be correlated.

According to an additional embodiment it is provided that, in case an image gap arises in the processed virtual surroundings due to the displacement of the at least one object in the foreground according to the determined lateral offset, the image gap in the processed virtual surroundings is closed with a virtual image fill content by applying an image gap fill criterion to the processed image data. The image gap fill criterion thus contains information about, for example, a coloring in the surroundings of the object in the foreground so that, for example, the virtual image gap can be filled with the corresponding virtual image fill content by a content-based image fill, for example, using a so-called content-aware fill algorithm which is stored in the image gap fill criterion. Thus, artificially created content is used to close the image gap that has arisen, so that when the at least one object is displaced in the foreground relative to the background, even without enlargement of the at least one object in the foreground, no visible empty space appears in the background. The image gap fill criterion can therefore be used to determine a suitable fill content based on the color values of the background image. This enables the wearer of the VR glasses to enjoy a trouble-free and comfortable experience of the processed virtual surroundings using the VR glasses, making minimal use of artificially generated image content.

In an additional embodiment, the acquired movement data is evaluated in order to determine a rotation angle of the at least one object positioned in the foreground of the virtual surroundings relative to the background. Processed image data is then determined that describes the processed virtual surroundings in which the at least one object in the foreground is shifted relative to the background according to the determined lateral offset and additionally rotated according to the determined rotation angles. In the case of the relative rotation of at least one object in the foreground relative to the background of the virtual surroundings, the probability value for the probability of a kinetosis for the wearer of the VR glasses is reduced below the predefined minimum probability value, so that the risk of kinetosis for the wearer of the VR glasses is also reduced. The rotation angle that is determined also reflects the movement performed by the vehicle, which is based on the movement data. For example, in addition to a purely lateral displacement, a slight rotational movement can be performed by the virtual object in the virtual foreground in order to visually display the movement experienced by the wearer of the VR glasses to the wearer as a result of the driving maneuver of the vehicle, for example, when the vehicle is cornering, in a realistic manner using the processed virtual surroundings. Thus, during a right-hand turn (relative to the direction of travel in the longitudinal direction of the vehicle), in addition to the purely lateral displacement to the left in the viewing direction, the slight turning movement counter-clockwise experienced by the body of the wearer can be simulated by turning the at least one object in the foreground by, for example, five degrees counter-clockwise (a rotation axis in this case passes through a center of the at least one virtual object in the viewing direction of the wearer). This further increases the comfort for the wearer of the VR glasses, as such a movement of the two image planes relative to each other has a particularly beneficial effect in terms of reducing the risk of kinetosis while the VR glasses are worn when driving with the vehicle.

Lateral displacement can generally be understood to mean not only a movement along a transverse axis of the vehicle, i.e. to the left or right with respect to a direction of travel in the longitudinal direction of the vehicle, but also as a movement perpendicular thereto upwards or downwards, i.e. along a vertical vehicle direction. For example, if the vehicle is traveling on a bumpy road with numerous potholes, which causes the wearer of the VR glasses to experience a movement upwards or downwards in the vehicle's vertical direction, this movement can also be simulated by a corresponding lateral displacement of the object positioned in the foreground relative to the background.

A second aspect of the method of operating VR glasses in a vehicle also reduces a risk of kinetosis for a wearer of the VR glasses in the vehicle. In this method for operating a control device of the VR glasses, data is received about the surroundings acquired by an acquisition device of the vehicle that describes a vehicle movement of the vehicle, as has already been explained for the first aspect of the method. However, next the virtual surroundings are enlarged by a predefined magnification factor so that an edge region of the virtual surroundings is outside a display area displayed on the VR glasses. The display area includes at least one sub-region of a field of vision of a wearer of the VR glasses. For example, the virtual surroundings can be enlarged by ten percent, resulting in the border of the virtual surroundings being no longer displayed by the VR glasses because it extends beyond their display area. The magnification may be chosen depending on the image quality and resolution of the VR glasses. For example, the magnification factor used here can be one percent, two percent, three percent, four percent, five percent, ten percent, 15 percent, 20 percent, 25 percent, or 30 percent.

The display area shown includes at least one predefined sub-region of the field of vision of the wearer of the VR glasses. This is often the case, for example, with a video or a cartoon as the virtual surroundings, which is displayed, for example, on a virtual canvas in the field of vision of the wearer of the VR glasses. If this is the case, the virtual surroundings displayed on the virtual canvas is enlarged while maintaining a constant size of the canvas, so that an edge region not displayed on the VR glasses is formed around the virtual canvas. In this example, the display area is the virtual canvas. In general, the viewing area may be considered to be the area displayed on the VR glasses for the VR glasses wearer, in which the virtual surroundings are displayed. The viewing area may not extend across the entire field of vision of the VR glasses wearer. The display area thus may include only one sub-region of the field of vision of the VR glasses wearer.

Next, the acquired movement data is evaluated to determine a movement trajectory for at least one area of the enlarged virtual surroundings located in the display area displayed. Ultimately, this determines a trajectory for any pixel in the enlarged virtual surroundings, which leads from a current position of that pixel on the display area to a target position on the display area. When the enlarged virtual surroundings is moved according to the determined movement trajectory, the risk of kinetosis for the VR glasses wearer is reduced in such a way that a probability value for a probability of a kinetosis is below a predefined minimum probability value. For example, if a central object is present in the enlarged virtual surroundings, it can be moved using the movement trajectory from a current position of a center of the object in the enlarged virtual surroundings to a position, for example, five millimeters to the left of this virtual object in the viewing direction of the wearer, wherein the entire enlarged virtual surroundings is also moved according to the described movement trajectory (i.e. not only the object named by way of example). This results in processed image data being determined as part of the method, wherein the processed image data describes a processed virtual surroundings in which the enlarged virtual surroundings is moved according to the movement trajectory. The processed virtual surroundings described by the processed image data is then displayed on the VR glasses.

By first enlarging the virtual surroundings, despite the movement of the image according to the movement trajectory it is possible to fill the entire display area with the virtual surroundings, because an area of the enlarged virtual surroundings always moves into view from the previously hidden edge region if, for example, the processed virtual surroundings is displaced in a specific direction according to the movement trajectory. Thus, the entire contents of the display area of the VR glasses can ultimately be displaced according to the movement data of the vehicle. For this purpose, the virtual surroundings is firstly enlarged and the edge region of the enlarged virtual surroundings is defined by limiting the display area of the VR glasses to the sub-region of the field of vision of the VR glasses wearer. Due to the edge regions protruding outside of this inner display area, image contents of the virtual plane are available in all directions around the display area, which can be moved into the visible display area when the image content is shifted in the visible region. This creates the impression of a stationary viewing window when the entire contents are shifted. Thus, with a stationary display area, the enlargement of the virtual surroundings ultimately ensures that the entire virtual surroundings can be moved according to the movement trajectory without causing an image gap to appear in the displayed virtual surroundings in the edge region of the display area. The impression perceived by the VR glasses wearer ultimately corresponds to a kind of camera panning or camera movement.

The advantage of this method is that most of the currently available image material is in the form of two-dimensional images, which generally do not fill the 360-degree viewing angle available in VR glasses. This will probably even continue to be the case, as a constant head rotation of full 360-degree angles is usually not attractive to the VR glasses wearer. This proposal of movement alignment using the determined movement trajectory does not require a complex algorithm for plane extraction or plane creation and, where applicable, image filling. Simply enlarging and shifting the content of the virtual surroundings is sufficient to visually support any movement experienced by the wearer.

At present, due to hardware limitations of VR glasses, further advantages are also obtained, as there is usually high-resolution image material available while the VR glasses themselves have a lower resolution. Due to the often much higher resolution of the image content of the virtual surroundings, digital magnification in the VR glasses does not mean a loss of image quality for the wearer of the VR glasses, while at the same time the risk of kinetosis can be significantly reduced. Thus, a particularly convenient reduction of the risk of kinetosis is achieved for the wearer of the VR glasses.

In an advantageous embodiment of the method, a distance traveled by the region of the enlarged virtual surroundings in the displayed display area according to the determined movement trajectory and a steering angle of the vehicle, which is included in the movement data, are correlated non-linearly. For example, the distance between the current position of a specific pixel and its target position as a result of the specified movement trajectory may thus be shorter than would be expected based on the detected steering angle of the vehicle. Thus, analogous to the non-linear correlation between the determined lateral offset and the steering angle of the vehicle described above in connection with the first aspect of the method, the movement trajectory in itself may cover a shorter distance than would be assumed based on the movement of the vehicle, since a larger movement of the vehicle relative to a first movement of the vehicle need not result in a larger change of position of the virtual surroundings compared to the change of position in the first movement. This means that although the risk of kinetosis is reduced, there is no noticeable adverse impact on the virtual surroundings itself due to the described method.

In an additional embodiment, when displaying the processed virtual surroundings described by the processed image data on the virtual reality glasses the processed virtual surroundings always fills the entire display area. Therefore, it is explicitly not provided that, due to the movement along the movement trajectory, the virtual surroundings is shifted in such a way that a gap in the displayed virtual surroundings is ultimately created despite the presence of the edge region. For this reason, it is provided that the entire display area of the virtual surroundings on the VR glasses is always filled by at least one sub-region of the enlarged virtual surroundings. This prevents gaps that suddenly appear in the edge region of the display area of the virtual surroundings from causing irritation to the VR glasses wearer, which allows a meaningful use of the VR glasses in the moving vehicle.

A particularly advantageous embodiment of the method provides that the VR glasses includes an acquisition unit and the control device takes into account glasses movement data, acquired by the acquisition unit, that describes a movement of the VR glasses as movement data. In addition to the movement data described above, which describes the acquired vehicle movement of the vehicle, data provided by the VR glasses themselves may be taken into account to determine the lateral offset and/or the movement trajectory definitively. For example, head movements of the VR glasses wearer can be detected, which can amplify or counteract, for example, a movement for the wearer in a direction of motion of the vehicle. For example, a movement, a speed of movement, a rotation and/or an acceleration of the movement of the glasses can be acquired and provided as the glasses movement data. For this purpose, the VR glasses include an appropriate glasses sensor device as an acquisition unit. As a result, a particularly reliable reduction of the risk of kinetosis for the VR glasses wearer can be achieved, since not only can the external influences on his or her body be taken into account, but the actual movement of the VR glasses is also taken into account by the glasses movement data.

The virtual reality system includes VR glasses and a vehicle. The VR system is designed to carry out a method as described above based on the evaluation of the determined lateral offset, and/or a method as described above based on the determination of a movement trajectory. The two methods described can therefore ultimately be combined. The embodiments presented in connection with the two methods and their advantages apply accordingly, where applicable, to the VR system. For this reason, the corresponding further developments of the virtual reality system are not described again here.

The vehicle may be designed as a motor vehicle, in particular as a passenger car or heavy goods vehicle, or as a passenger bus or motorcycle.

As an alternative to the VR glasses described above, corresponding mixed reality (MR) glasses can be used.

The control device of the VR glasses has a processor device which is configured to carry out an embodiment of the method according to the invention. For this purpose, the processor device may include at least one microprocessor and/or at least one microcontroller and/or at least one FPGA (field programmable gate array) and/or at least one DSP (digital signal processor). Furthermore, the processor device can have program code which is configured, when executed by the processor device, to carry out the embodiment of the method according to the invention. The program code can be stored in a data memory of the processor device.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 2 is a schematic representation of a signal flow graph for a method for operating virtual reality glasses in a vehicle, taking into account a lateral offset; and FIG. 3 is a schematic representation of a signal flow graph for a method for operating virtual reality glasses in a vehicle, taking into account a determined movement trajectory.

DETAILED DESCRIPTION

Figure 1:
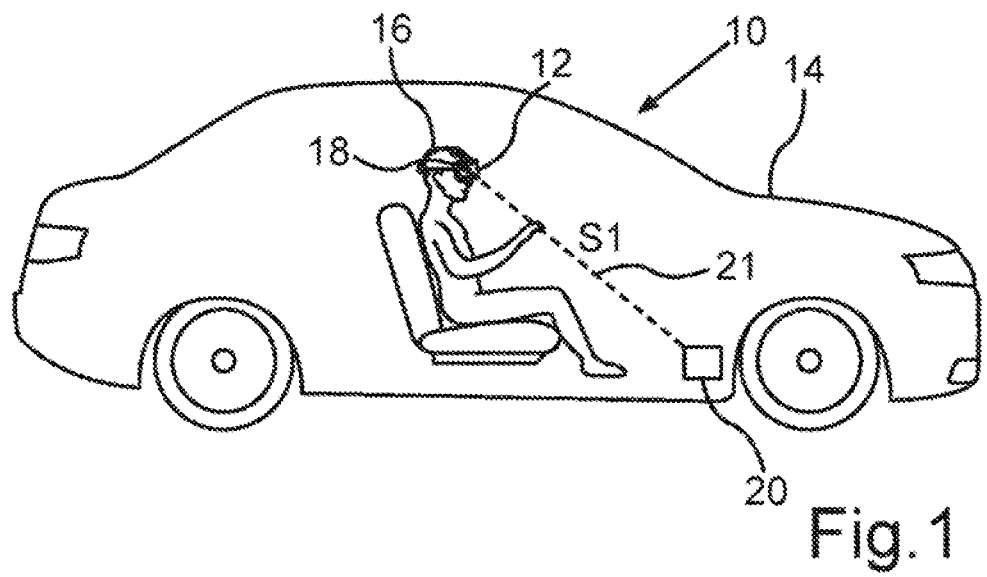
FIG. 1 is a schematic representation of a virtual reality system for a vehicle.

In the exemplary embodiments, the described components of the embodiments each represent individual features, which are to be considered independently of each other and be developed independently of each other. Therefore, the disclosure is also intended to include combinations of the features of the embodiments other than those presented. Furthermore, the embodiments described can also be extended to include other features already described.

In the figures, identical reference signs designate functionally equivalent elements.

FIG. 1 shows a sketch of a virtual reality (VR) system 10. The VR system 10 includes a pair of VR glasses 12 and a vehicle 14, which is a motor vehicle. A wearer 16 of the VR glasses 12 is present in the vehicle 14. The VR glasses 12 includes a control device 18 which is used to control the VR glasses 12. The vehicle 14 includes an acquisition device 20 which acquires movement data describing a vehicle movement of the vehicle 14. The acquired movement data is transmitted by the acquisition device 20 to the control device 18 of the VR glasses 12. In S1, the movement data describing the movement of the vehicle 14, acquired by the acquisition device 20 of the vehicle 14, is received by the control device 18 of the VR glasses 12. The acquisition device 20 acquires a current acceleration, a current speed, a current steering angle and/or a current change in altitude of the vehicle 14, for example due to driving on a bumpy road.

FIG. 2 shows a sketch of a virtual surroundings 22 that is displayed by the VR glasses 12. The virtual surroundings 22 in this case is stored in the control unit 18 based on predefined image data. The virtual surroundings 22 shows a landscape, in the background 24 of which a mountain range can be seen, whereas in a foreground 26 of the virtual surroundings 22 a tree 28 can be seen as an object 28 positioned there. In S2, the image data describing the virtual surroundings 22 is split into a background image dataset characterizing the background 24 of the virtual surroundings 22, and at least one foreground image dataset characterizing at least one tree 28 positioned in the foreground 26 of the virtual surroundings 22. This splitting is carried out by applying an image processing criterion to the image data describing the virtual surroundings 22. For example, classical methods of digital image processing are thus used, so that, for example, using an edge filter and/or a sharpness criterion, the tree 28 can be distinguished from the background 24 as an object 28 in the foreground 26. In the background 24 there is now an image gap 30, since the tree 28, now described only by the foreground image dataset, is cut out of the background image dataset.

In S3, the acquired movement data of the vehicle 14 is evaluated to determine a lateral offset 32 between the tree 28 positioned in the foreground 26 of the virtual surroundings 22 and the background 24. FIG. 2 shows the lateral offset 32 in the form of an arrow. In addition, dashed lines are used to sketch the original position of the tree, which is now occupied by the image gap 30 in the background image data set.

Then, in S4, processed image data is determined that describes a processed virtual surroundings 34 in which the tree 28 in the foreground 26 is shifted relative to the background 24 according to the determined lateral offset 32. Then, the virtual surroundings 34 described by the processed image data is displayed on the VR glasses 12 for the wearer 16.

The presence of the lateral offset 32 ensures that, due to the relative displacement of the tree 28 in the foreground 26 with respect to the background 24 of the virtual surroundings 22, a kinetosis risk for the wearer 16 of the VR glasses 12 is reduced in such a way that a probability value for a probability of kinetosis for the wearer 16 is below a predefined minimum probability value. For example, the risk of suffering from travel sickness, known as kinetosis, for the wearer 16 of the VR glasses 12 is significantly reduced despite the movement of the vehicle 14 according to the movement data.

If, as outlined here, an image gap 30 arises in the processed virtual surroundings 34 due to the displacement of the tree 28 in the foreground 26 according to the determined lateral offset 32, the image gap 30 in the processed virtual surroundings 34 is closed with a virtual image fill content 36 by applying an image gap fill criterion to the processed image data. This image fill content 36 can be artificially generated, for example using a color value in an area surrounding the image gap 30. For example, if there is a virtual light green meadow around the virtual tree 28, a corresponding image fill content 36 in the same color as this virtual meadow can be used to ensure that the image gap 30 is no longer visible to the wearer 16 of the VR glasses 12.

Alternatively, or in addition to the lateral offset 32 described, the tree 28 in the foreground 26 can also be enlarged with a predefined magnification factor so that an enlarged tree 38 is visible in the foreground 26. In the processed virtual surroundings 34, the enlarged tree 38 is displaced relative to the background 24. This is illustrated here by the differences between the original tree 28 represented with dashed lines and the enlarged tree 38 shown larger and drawn with a solid line in the processed virtual surroundings 34. That is to say, the initial enlargement of the tree 28 by the predefined magnification factor, takes place in S5, after which the virtual surroundings 34 is determined in in an operation similar to S4.

The lateral offset 32 in this case can be correlated non-linearly with the steering angle of the vehicle 14 included in the movement data. In order not to have to shift the respective image contents too far during large vehicle movements, the displacement specified by the lateral offset 32 can be carried out with an attenuated movement, which ultimately only implies the change in acceleration of the vehicle 14 experienced by the wearer 16.

The acquired movement data can also be used to determine a rotation angle of the tree 28 in the foreground 26 relative to the background 24. This makes it possible, for example, to particularly emphasize a right-hand turn of the vehicle 14 by not only shifting the tree 28 laterally, as in this example to the left in the viewing direction of the wearer 16, but also by slightly rotating it counter-clockwise (with a rotation axis parallel to the viewing direction). A rotation by an angle between 0 degrees and 90 degrees is possible.

FIG. 3 shows an alternative or additional method for reducing the risk of kinetosis for the wearer 16 of the VR glasses 12. After S1, as described above, in this case the virtual surroundings 22 is enlarged by a predefined magnification factor so that an edge region 42 is formed in a display area 40 of the VR glasses 12, wherein parts of the enlarged virtual surroundings 38 are still present in this edge region 42. However, the edge region 42 is no longer displayed on the VR glasses 12. Only the display area 40, the boundary of which with the edge region 42 is sketched here with a dashed line, is displayed on the VR glasses 12. The enlargement of the virtual surroundings 22 to the enlarged virtual surroundings 38 is carried out in S6. The display area 40 includes at least one sub-region of a field of vision of the wearer 16 of the VR glasses 12. For example, the display area 40 with the virtual landscape displayed on it is located in the direct field of vision of the wearer 16 of the VR glasses 12 as a canvas, with a visual edge region arranged around the display area 40 displayed in black and without any virtual content displayed there for the wearer 16. The visual edge region is located around the edge of the display area 40, drawn with a solid line, and covers the content limited by a dashed and/or dotted line, since the corresponding content outside the display area 40 is not displayed to the wearer 16 of the VR glasses 12. A video display and/or a cartoon shown on the display area 40 is suitable as a virtual surroundings.

In S7, on the one hand, the acquired movement data is then evaluated to determine a movement trajectory 44 for at least one area of the enlarged virtual surroundings 38 located in the display area 40. Then, in S8 processed image data describing a processed virtual surroundings 34 is determined, in which the enlarged virtual surroundings 38 is moved according to the movement trajectory 44. Finally, the processed virtual surroundings 34 described by the processed image data is displayed on the VR glasses 12. The distance traveled according to the determined movement trajectory 44 and the steering angle of the vehicle 14, which is included in the movement data, can be correlated non-linearly. In addition, the processed virtual surroundings 34 always fills the whole display area 40. The originally displayed display area 40 is marked here with a dotted line, whereas the processed virtual surroundings 34 displayed is shown within the dashed edge region and thus as display area 40'.

In addition to the described movement data, which describes the driving motion of the vehicle 14, glasses movement data of the VR glasses 12 can also be used as movement data, which is provided by an appropriate sensor device of the VR glasses 12, the acquisition unit of the VR glasses.

Overall, the examples show a reduction of a kinetosis risk in a VR system 10. As an alternative to VR glasses, a pair of mixed reality glasses, i.e. a so-called MR system, can be provided.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide* v. *DIRECTV*, 358 F3d 870, 69 USPQ2d 1865 (Fed. Cir. 2004).

The invention claimed is:

1. A method of operating virtual reality glasses in a vehicle, in which a virtual surrounding described by image data is displayed by the virtual reality glasses, the method performed by a control device of the virtual reality glasses comprising:
   receiving movement data describing a movement of the vehicle acquired by an acquisition device of the vehicle;
   splitting the image data describing the virtual surrounding into a background image dataset that characterizes a background of the virtual surrounding, and at least one foreground image dataset that characterizes at least one object positioned in a foreground of the virtual surrounding, by applying an image processing criterion to the image data describing the virtual surrounding;
   evaluating the movement data including a steering angle of the vehicle to determine a lateral offset between a position of the at least one object positioned in the foreground of the virtual surrounding and the background, wherein the determined lateral offset and the steering angle of the vehicle are correlated non-linearly;
   determining processed image data describing a processed virtual surrounding in which the at least one object in the foreground is shifted relative to the background according to the determined lateral offset; and
   displaying the processed virtual surrounding described by the processed image data on the virtual reality glasses.

2. The method as claimed in claim 1, wherein a displacement specified by the determined lateral offset is carried out with an attenuated movement.

3. The method as claimed in claim 1, further comprising enlarging the at least one object positioned in the foreground of the virtual surrounding by a magnification factor, so that relative to the processed virtual surrounding the enlarged at least one object is shifted relative to the background.

4. The method as claimed in claim 3, wherein, when an image gap arises in the processed virtual surrounding due to a displacement of the at least one object in the foreground according to the determined lateral offset, the image gap in the processed virtual surrounding is closed with a virtual image fill content by applying an image gap fill criterion to the processed image data.

5. The method as claimed in claim 4,
further comprising evaluating the movement data to determine a rotation angle of the at least one object positioned in the foreground of the virtual surrounding relative to the background, and
wherein the processed image data is determined to describe the processed virtual surrounding, in which the at least one object in the foreground is shifted relative to the background according to the determined lateral offset and rotated according to the determined rotation angle.

6. The method as claimed in claim 1, further comprising enlarging the at least one object positioned in the foreground of the virtual surrounding by a magnification factor, so that relative to the processed virtual surrounding the enlarged at least one object is shifted relative to the background.

7. The method as claimed in claim 1, wherein, when an image gap arises in the processed virtual surrounding due to a displacement of the at least one object in the foreground according to the determined lateral offset, the image gap in the processed virtual surrounding is closed with a virtual image fill content by applying an image gap fill criterion to the processed image data.

8. The method as claimed in claim 1,
further comprising evaluating the movement data is evaluated to determine a rotation angle of the at least one object positioned in the foreground of the virtual surrounding relative to the background, and
wherein the processed image data is determined to describe the processed virtual surrounding, in which the at least one object in the foreground is shifted relative to the background according to the determined lateral offset and rotated according to the determined rotation angle.

9. A method of operating virtual reality glasses in a vehicle, in which a virtual surrounding described by image data is displayed by the virtual reality glasses, the method performed by a control device of the virtual reality glasses comprising:
receiving movement data describing a vehicle movement of the vehicle acquired by an acquisition device of the vehicle;
enlarging the virtual surrounding by a magnification factor, so that an edge region of the virtual surrounding lies outside a display area displayed on the virtual reality glasses, the display area including at least one sub-region of a field of view of a wearer of the virtual reality glasses;
evaluating the movement data to determine a movement trajectory for at least one area of the enlarged virtual surrounding located in the display area;
determining processed image data describing a processed virtual surrounding in which the enlarged virtual surrounding is moved according to the movement trajectory; and
displaying the processed virtual surrounding described by the processed image data on the virtual reality glasses, with a distance traveled by the region of the enlarged virtual surrounding in the displayed display area according to the determined movement trajectory and a steering angle of the vehicle included in the movement data are correlated non-linearly.

10. The method as claimed in claim 9, wherein when displaying the processed virtual surrounding described by the processed image data on the virtual reality glasses, the processed virtual surrounding fills the entire display area.

11. The method as claimed in claim 10, wherein the virtual reality glasses include an acquisition unit and the control device takes into account glasses movement data acquired by the acquisition unit that describes a movement of the virtual reality glasses as the movement data.

12. The method as claimed in claim 9, wherein the virtual reality glasses include an acquisition unit and the control device takes into account glasses movement data acquired by the acquisition unit that describes a movement of the virtual reality glasses as the movement data.

13. A virtual reality system operating in a vehicle, comprising:
virtual reality glasses; and
a controller of the virtual reality system configured to perform a method including,
receiving movement data describing a movement of the vehicle acquired by an acquisition device of the vehicle;
splitting the image data describing the virtual surrounding into a background image dataset that characterizes a background of the virtual surrounding, and at least one foreground image dataset that characterizes at least one object positioned in a foreground of the virtual surrounding, by applying an image processing criterion to the image data describing the virtual surrounding;
evaluating the movement data including a steering angle of the vehicle to determine a lateral offset between a position of the at least one object positioned in the foreground of the virtual surrounding and the background, wherein the determined lateral offset and the steering angle of the vehicle are correlated non-linearly;
determining processed image data describing a processed virtual surrounding in which the at least one object in the foreground is shifted relative to the background according to the determined lateral offset; and
displaying the processed virtual surrounding described by the processed image data on the virtual reality glasses.

14. The virtual reality system as claimed in claim 13, wherein a displacement specified by the determined lateral offset is carried out with an attenuated movement.

15. The virtual reality system as claimed in claim 13, wherein the method further comprising enlarging the at least one object positioned in the foreground of the virtual surrounding by a magnification factor, so that relative to the processed virtual surrounding the enlarged at least one object is shifted relative to the background.

16. The virtual reality system as claimed in claim 13, wherein, when an image gap arises in the processed virtual surrounding due to a displacement of the at least one object in the foreground according to the determined lateral offset, the image gap in the processed virtual surrounding is closed with a virtual image fill content by applying an image gap fill criterion to the processed image data.

17. The virtual reality system as claimed in claim 13, further comprising evaluating the movement data is evaluated to determine a rotation angle of the at least one object positioned in the foreground of the virtual surrounding relative to the background, and
wherein the processed image data is determined to describe the processed virtual surrounding, in which the at least one object in the foreground is shifted relative to the background according to the determined lateral offset and rotated according to the determined rotation angle.

18. A virtual reality system operating in a vehicle, comprising:
virtual reality glasses; and
a controller of the virtual reality system configured to perform a method including,
receiving movement data describing a vehicle movement of the vehicle acquired by an acquisition device of the vehicle;
enlarging the virtual surrounding by a magnification factor, so that an edge region of the virtual surrounding lies outside a display area displayed on the virtual reality glasses, the display area including at least one sub-region of a field of view of a wearer of the virtual reality glasses;
evaluating the movement data to determine a movement trajectory for at least one area of the enlarged virtual surrounding located in the display area;
determining processed image data describing a processed virtual surrounding in which the enlarged virtual surrounding is moved according to the movement trajectory; and
displaying the processed virtual surrounding described by the processed image data on the virtual reality glasses, with a distance traveled by the region of the enlarged virtual surrounding in the displayed display area according to the determined movement trajectory and a steering angle of the vehicle included in the movement data are correlated non-linearly.

19. The virtual reality system as claimed in claim 18, wherein when displaying the processed virtual surrounding described by the processed image data on the virtual reality glasses, the processed virtual surrounding fills the entire display area.

20. The virtual reality system as claimed in claim 18,
wherein the virtual reality glasses include an acquisition unit, and
wherein the controller takes into account glasses movement data acquired by the acquisition unit that describes a movement of the virtual reality glasses as the movement data.

* * * * *

UNITED STATES PATENT AND TRADEMARK OFFICE
CERTIFICATE OF CORRECTION

| | | |
|---|---|---|
| PATENT NO. | : 12,013,534 B2 | Page 1 of 1 |
| APPLICATION NO. | : 17/642127 | |
| DATED | : June 18, 2024 | |
| INVENTOR(S) | : Tobias Moll et al. | |

It is certified that error appears in the above-identified patent and that said Letters Patent is hereby corrected as shown below:

On the Title Page

Abstract, Item (57), Column 2, Line 1, delete "vehicle" and insert --vehicle,--.

Abstract, Item (57) Column 2, Line 15, after "by" delete "means of".

Signed and Sealed this
Eighth Day of October, 2024

Katherine Kelly Vidal
*Director of the United States Patent and Trademark Office*